United States Patent [19]

Suzuki et al.

[11] Patent Number: 5,004,328
[45] Date of Patent: Apr. 2, 1991

[54] SPHERICAL LENS AND IMAGING DEVICE USING THE SAME

[75] Inventors: Masayuki Suzuki; Jun Hattori, both of Atsugi, Japan

[73] Assignee: Canon Kabushiki Kaisha, Tokyo, Japan

[21] Appl. No.: 103,126

[22] Filed: Sep. 25, 1987

[30] Foreign Application Priority Data

Sep. 26, 1986 [JP] Japan .................................. 61-229083
Oct. 13, 1986 [JP] Japan .................................. 61-243686
Oct. 13, 1986 [JP] Japan .................................. 61-243687
Oct. 13, 1986 [JP] Japan .................................. 61-243688

[51] Int. Cl.$^5$ .............................................. G02B 3/00
[52] U.S. Cl. ..................................... 350/416; 350/413; 350/449
[58] Field of Search ...................... 350/413, 416, 449

[56] References Cited

U.S. PATENT DOCUMENTS

| | | | |
|---|---|---|---|
| 3,166,623 | 1/1965 | Waidelich, Jr. | 350/416 X |
| 3,666,347 | 5/1972 | Kitano et al. | 350/413 X |
| 4,257,672 | 3/1981 | Balliet | 350/416 X |
| 4,354,734 | 10/1982 | Nakahashi | 350/416 X |
| 4,422,733 | 12/1983 | Kikuchi et al. | 350/416 X |
| 4,557,566 | 12/1985 | Kikuchi et al. | 350/416 X |

*Primary Examiner*—Scott J. Sugarman
*Attorney, Agent, or Firm*—Fitzpatrick, Cella, Harper & Scinto

[57] ABSTRACT

A spherical lens includes a spherical shell-shaped lens composed of a medium of a refractive index $n_1$ and a sphere-shaped lens composed of a medium of a refractive index $n_2$ smaller than $n_1$, positioned inside the spherical shell-shaped lens to constitute a concentric sphere therewith. An imaging system includes a spherical lens, an imaging device having a light receiving surface curved along the curved image plane of the spherical lens and adapted to pick up the image formed by the spherical lens with the light receiving surface and a processor for processing image signals output from the imaging device. The imaging system may also include a bundle of light transmitting members, of which, light entrance ends are positioned along the curved image plane of the spherical lens and which are adapted to transmit an image, formed by the spherical lens, to the light exit ends thereof.

16 Claims, 10 Drawing Sheets

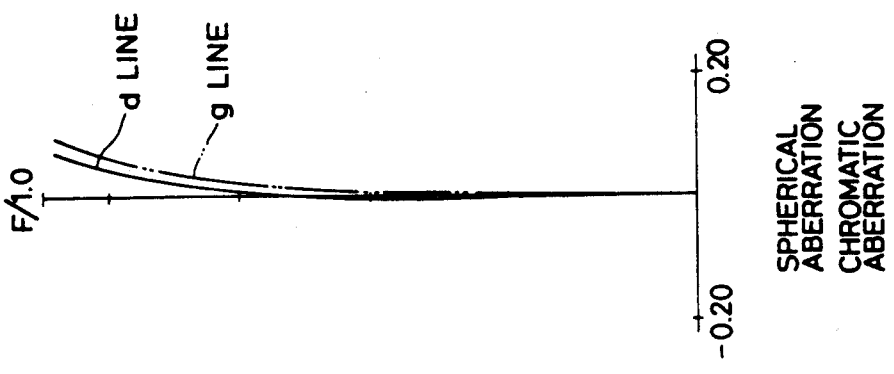
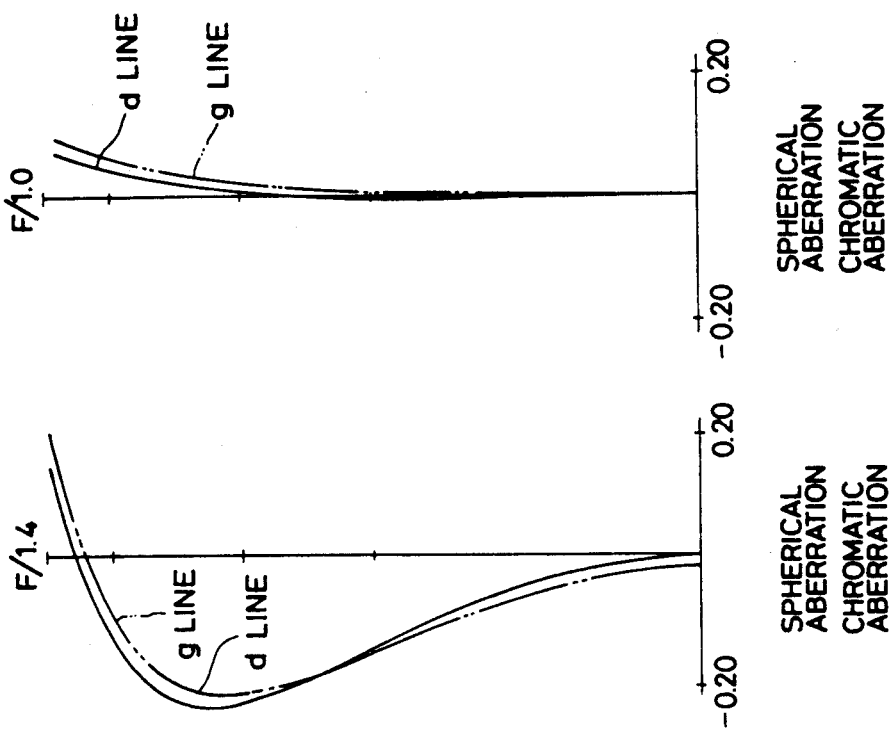
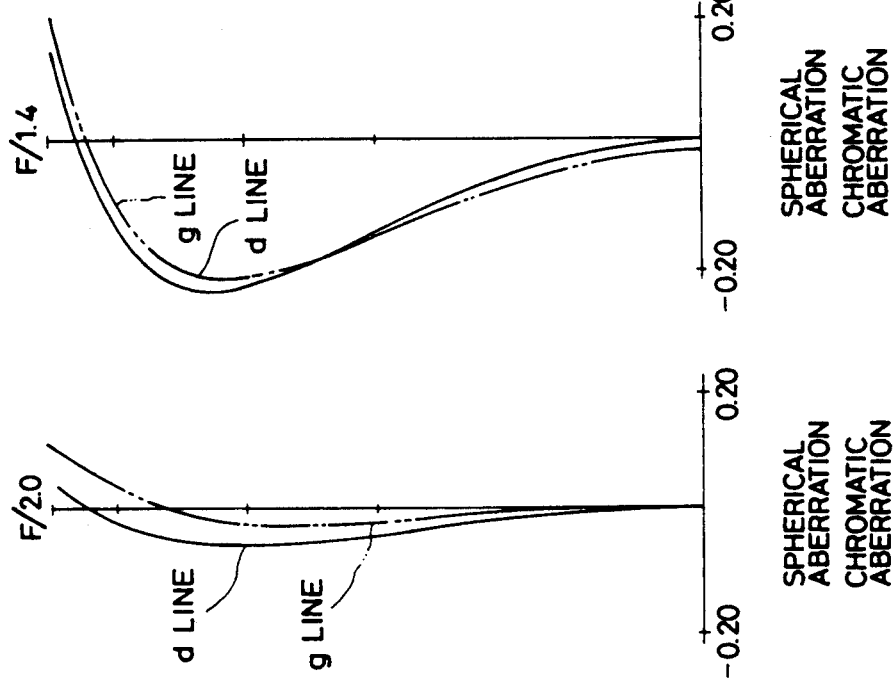
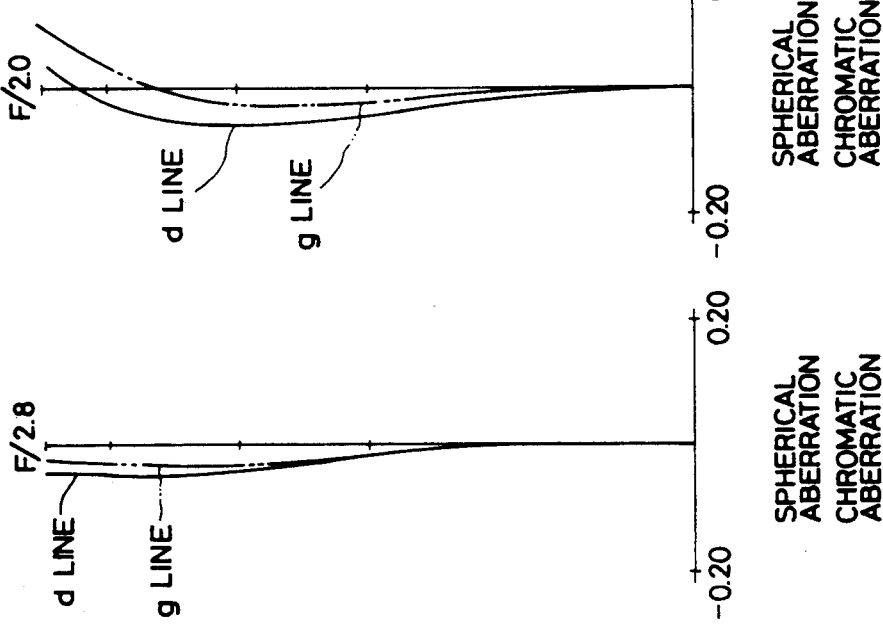

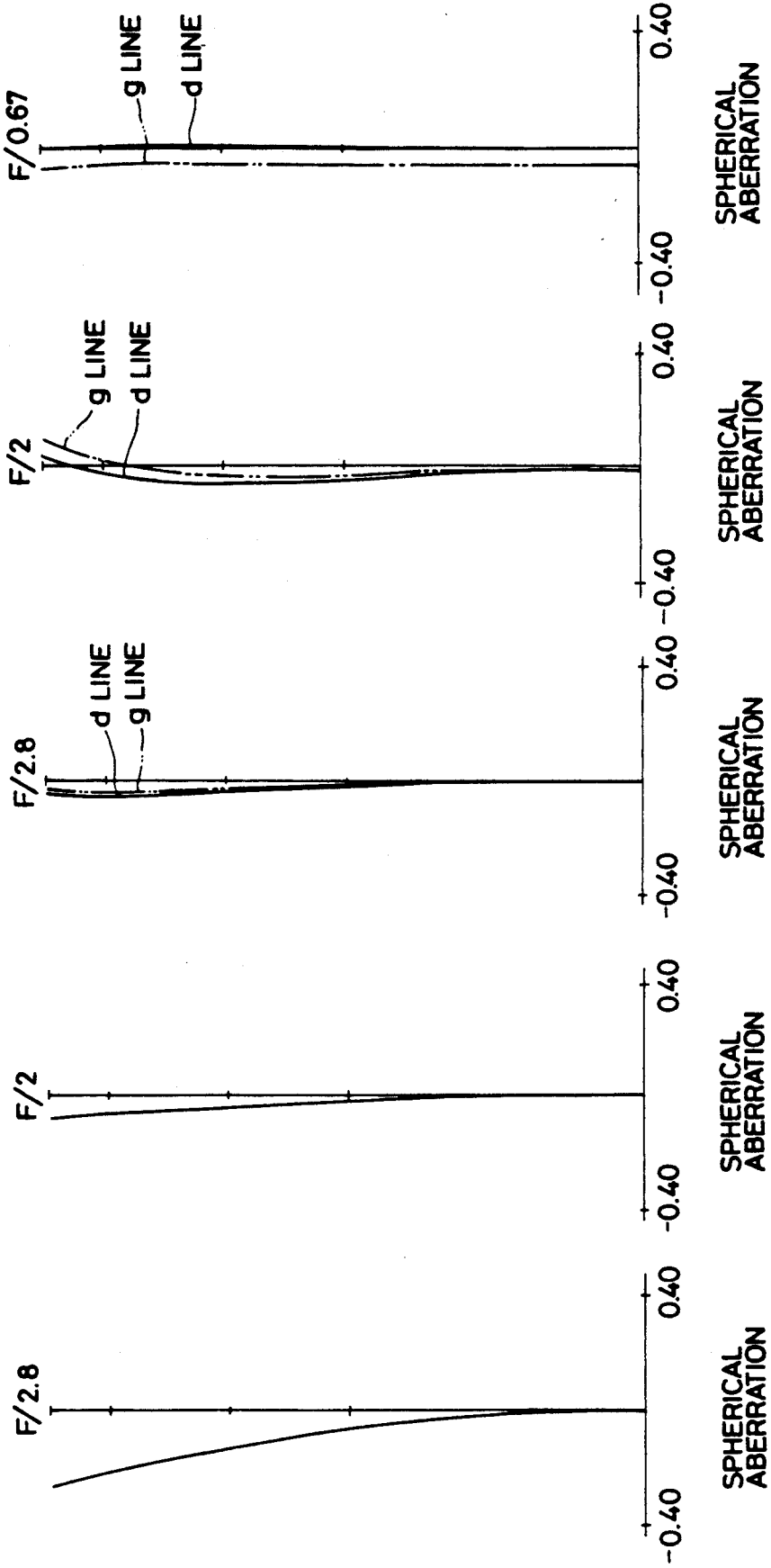

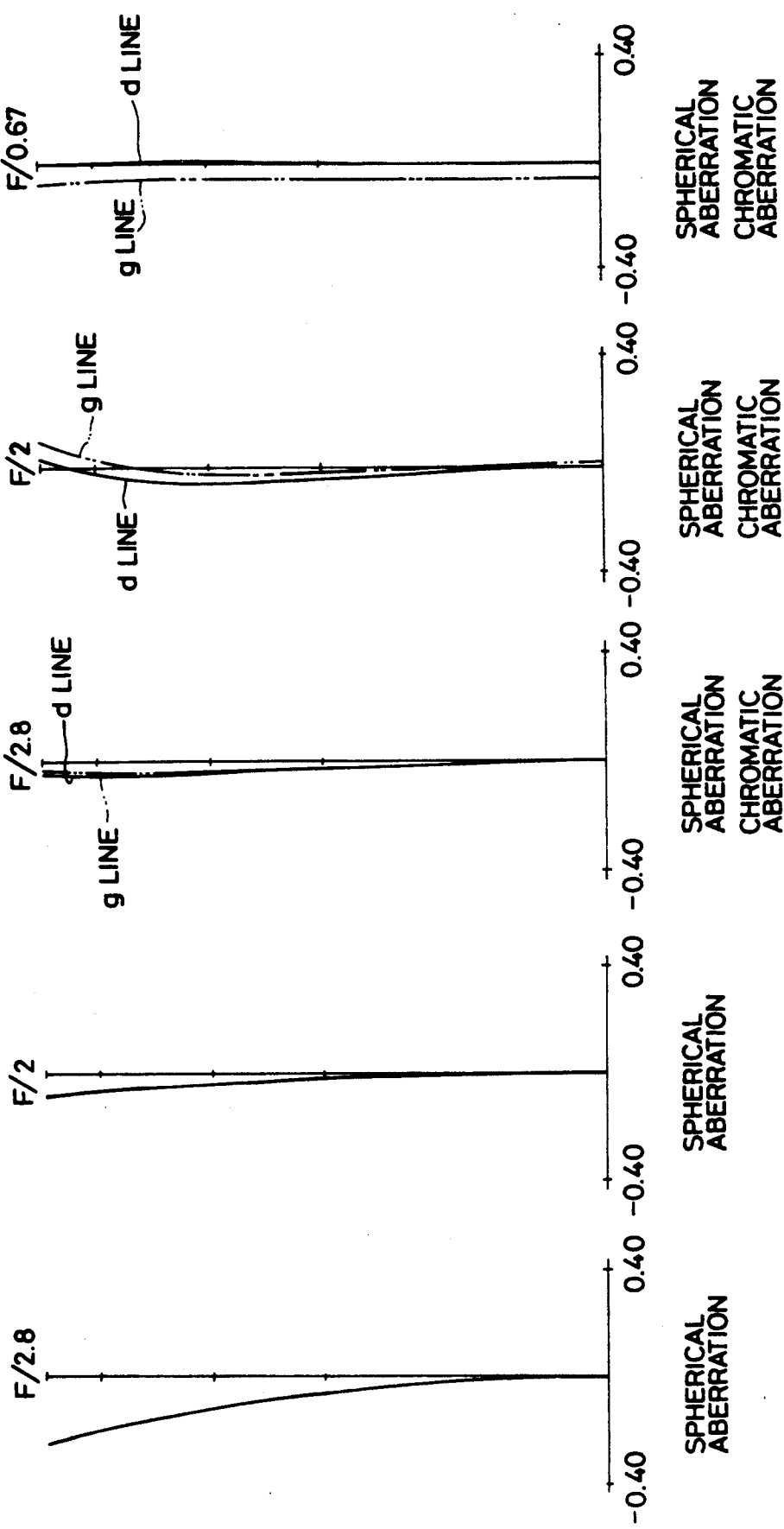

SPHERICAL LENS AND IMAGING DEVICE USING THE SAME

BACKGROUND OF THE INVENTION

1. Field of the Invention

The present invention relates to a spherical lens and an imaging device utilizing such spherical lens, and more particularly to a spherical lens of high performance of uneven medium, such as a spherical lens composed of concentric spheres of mutually different media, and an imaging device of a high resolving power and a wide imaging angle utilizing such spherical lens.

2. Related Background Art

A spherical lens of a single medium is already well known. In such spherical lens of a single medium, the refractive index is the only freedom for correcting the aberration for a given radius, and a medium of high refractive index is required for correcting the spherical aberration. However such spherical lens could not be used for the applications requiring a high resolving power, as the spherical aberration cannot be completely eliminated even with a medium of high refractive index. Also such lens could not be used for applications utilizing white light, since the medium of high refractive index generally has a high dispersive power, giving rise to a significant color aberration.

On the other hand, spherical lenses of unhomogeneous medium are disclosed for example in the U.S. Pat. Nos. 4,257,672, 4,327,963 and 4,557,566 and the U.S. patent application Ser. No. 027,737, now U.S. Pat. No. 4,848,882 etc., of the present Applicant.

However the spherical lenses disclosed in the above-mentioned U.S. patents do not have performance enough for the applications requiring a high resolving power.

Also the spherical lens disclosed in the above-mentioned U.S. patent application Ser. No. 027,737 now U.S. Pat. No. 4,848,882 shows a very high performance but requires a special pattern of distribution of refractive index inside the lens.

On the other hand, there have been designed various lens systems in order to expand the imaging angle of the image taking optical system. In such optical systems, an increase in the image size inevitably increases the lens diameter, thus giving rise to a bulky optical system. Also the conventional optical system, if designed for a wide imaging angle, will result in a significant decrease of the light intensity in the peripheral area, due to the well known cosine fourth power law.

The above-mentioned spherical lens has long been known as a simple optical system capable of achieving a wide imaging angle, but it has not been possible to obtain image information by focusing the image of an object for example on an image sensor such as a CCD through a shperical lens, since such spherical lens does not have a flat focal plane. For these reasons there has been desired an imaging device capable of achieving a high resolving power and a wide imaging angle.

SUMMARY OF THE IMVENTION

In consideration of the foregoing, a first object of the present invention is to provide a spherical lens of a simple structure in which the spherical aberration is almost completely corrected.

A second object of the present invention is to provide a spherical lens in which the chromatic aberration is also completely corrected.

A third object of the present invention is to provide a spherical lens having satisfactory imaging characteristic in both axial and non-axial positions.

A fourth object of the present invention is to provide a spherical lens having satisfactory imaging characteristic and capable of intercepting harmful lights such as flare.

A fifth object of the present invention is to provide an imaging device having a substantially spherical lens, capable of easily achieving a wide imaging angle and a desired resolving power.

A sixth object of the present invention is to provide an imaging device capable of easily achieving a wide imaging angle and a high resolving power, and providing desired image data.

The above-mentioned first object can be achieved, in the present invention, by a spherical lens composed of a spherical shell-shaped lens of a medium of a refractive index $n_1$ and a concentric sphere-shaped lens of a medium of a refractive index $n_2$ positioned inside said spherical shell-shaped lens, wherein $n_1 > n_2$.

The above-mentioned second object can be achieved, in the present invention, by the above-mentioned spherical lens further satisfying a relation $\gamma_2 > \gamma_1$ and $\gamma_2$ are the Abbe numbers respectively of said spherical shell-shaped lens and said sphere-shaped lens.

The above-mentioned third of object can be achieved, in the present invention, by the use of a spherical image plane for a spherical lens.

The above-mentioned fourth object can be achieved, in the present invention, by a spherical lens having a diaphragm in said concentric sphere, on a plane passing through the center of said sphere.

The above-mentioned fifth object can be achieved, in the present invention, by an imaging device characterized in having a spherical lens and image pickup means having a light-receiving surface curved along the curved image plane of said spherical lens, wherein the image of an object is formed through said spherical lens onto said light-receiving surface.

The above-mentioned sixth object can be achieved, in the present invention, by an imaging device characterized in having a spherical lens, image pickup means having a light-receiving surface curved along the curved image plane of said spherical lens, and a process device processing the image signal from said image pickup means to obtain a desired image.

In one embodiment, said imaging device is composed of a spherical lens, a bundle of light transmitting members of which entrance ends are positioned on the curved image plane of said spherical lens, and image pickup means provided at the exit ends of said light transmitting members.

Other features of the present invention will become fully apparent from the following embodiments, but the present invention will not be limited by such embodiments.

Consequently, for those skilled in the art, it is possible to realize various spherical lenses and imaging devices based on the concept of the present invention.

BRIEF DESCRIPTION OF THE DRAWINGS

FIGS. 3 to 6 are aberration charts showing the spherical and chromatic aberrations of numerical examples 4, 7, 8 and 9 of the present spherical lens;

FIGS. 11 to 15 are charts showing the spherical aberration of the spherical lenses employed in numerical examples 10 to 14 of said imaging device;

FIGS. 22 to 26 are aberration showing the spherical and chromatic aberrations of the spherical lenses in numerical examamples 15 to 19.

DETAILED DESCRIPTION OF THE PREFERRED EMBODIMENTS

Now the present invention will be clarified in detail by embodiments shown in the attached drawings and shown by design data.

Figure 1:
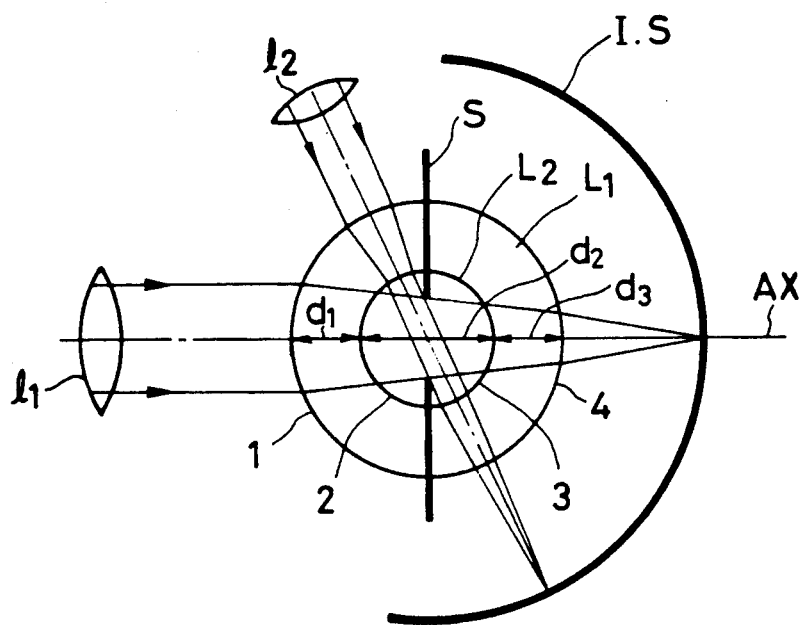
FIG. 1 is a cross-sectional view showing an embodiment of the spherical lens of the present invention.

FIG. 1 is a cross-sectional view of an embodiment of a spherical lens of the present invention, composed of a lens $L_1$ of a spherical shell-shaped medium and a lens $L_2$ of sphere-shaped medium, wherein the lens $L_1$ has a spherical inner surface adhered to the spherical surface of the lens $L_2$ so that the lenses $L_1$ and $L_2$ constitute concentric spheres. Reference numerals 1, 2 ,3 and 4 respectively indicate first, second, third and fourth faces of the spherical lens, numbered in the order of passing of the light, with respective radii of curvature $r_1$, $r_2$, $r_3$, and $r_4$. Since the present spherical lens is composed of concentric spheres, the faces of the lenses $L_1$, $L_2$ have a common center of curvature, so that $r_3 = -r_2$ and $r_4 = -r_1$. On the optical axis AX, $d_1$ indicates the axial distance between the first face 1 and the second face 2, $d_2$ is the axial distance between the second face 2 and the third face 3, and $d_3$ is the axial distance between the third face 3 and the fourth face 4, wherein $d_3 = d_1$. A diaphragm S is provided on a plane passing through the center of the concentric spheres and perpendicular to the optical axis AX.

There are also an axial incident beam $l_1$, an off-axial incident beam $l_2$ and an image plane IS, composed of a spherical plane spaced by a predetermined distance on the optical axis AX from the fourth face 4 of the spherical lens.

As shown in FIG. 1, the spherical lens of the present embodiment is composed of concentric spheres consisting of the lenses $L_1$ and $L_2$ whereby the light entering said spherical lens, for example the parallel light $l_1$ or $l_2$, is refracted by the first and second faces 1, 2, then passes the diaphragm S, and is again refracted by the third and fourth faces 3, 4 to reach the image plane IS. The media of the lenses $L_1$, $L_2$ constituting the spherical lens respectively have refractive index and Abbe number $n_1$, $\gamma_1$; $n_2$, $\gamma_2$ which can be suitably selected to correct the spherical and chromatic aberrations.

In the following there will be explained the method of correcting the spherical and chromatic aberrations in the present spherical lens.

A refractive surface of an ordinary spherical lens of uniform medium always has a positive refractive power. Consequently the spherical aberration always assumes a negative value. Also the chormatic aberration assumes a negative value for a similar reason. Therefore, in order to correct the spherical aberration, it is necessary to provide the optical system composed of a spherical lens with a negative refractive surface, and to cancel the above-mentioned negative spherical aberration with a positive spherical aberration generated by said negative refractive surface. In the present invention, the spherical lens is composed of concentric spheres to increase the number of refractive surfaces, thereby forming a negative refractive surface mentioned above. More specifically the refractive index $n_2$ of the sphere-shaped lens $L_2$ is selected smaller than that $n_1$ of the spherical shell-shaped lens $L_1$, thereby generating a negative refractive power at the interface of two media, i.e. at the second and third faces 2, 3 shown in FIG. 1. On the other hand, in order to correct the chromatic aberration together with the spherical aberration, a positive chromatic aberration may be generated at said interface, by selecting Abbe number $\gamma_1$ of the lens $L_1$ smaller than that $\gamma_2$ of the lens $L_2$.

The above-mentioned conditions are summarized by the following relations:

$$n_1 > n_2 \qquad (1)$$

$$\gamma_1 < \gamma_2 \qquad (2)$$

In the spherical lens of the present embodiment, $n_1$, $n_2$, $\gamma_1$ and $\gamma_2$ are so selected as to satisfy the relations (1) and (2) whereby the spherical and chromatic aberrations are satisfactorily corrected.

The spherical lens of the present embodiment has a spherical image plane IS, and , in consideration of the off-axial imaging characteristic, it is preferable to position the center of curvature of the image plane IS at the center of curvature of the spherical lens, thereby forming the image plane IS concentric to the spherical lens. In such case the coma and astigmatism do not appear even for the non-axial light. Although a negative curvature of image plane appears slightly when the present spherical lens is used at a finite object distance, the amount of said curvature is practically permissible. Consequently the correction of the spherical and chromatic aberrations mentioned above the non-axial imaging characteristic, thereby easily achieving a wide imaging angle. In such case, however, the image height is proportional to the imaging angle as in a so-called $f - \theta$ lens, and a negative distortion aberration is generated. Said aberration cannot be easily corrected optically in a spherical lens, but can be easily corrected electrically through the use of photoelectric converting means such as a CCD.

As explained above, the image plane IS should preferably be concentric with the spherical lens. However, if the distance between the image plane and the spherical lens is varied for focusing according to the distance to the object, said concentric relation can only be maintained by a continuous change of the curvature of the image plane IS in response to the state of focusing, and such change is not practical. The radius $r_i$ of the image plane IS should practically be constant and should also satisfy a relation:

$$f \leq r_i \leq \frac{Sf}{S-f} \quad (3)$$

wherein f is the focal length of the spherical lens, and S is the distance from a nearest object point to the center of the spherical lens. The right-hand side of the relation (3) indicates the quasi-axial position of the image plane for a nearest object point (distance from the center of the lens). A value of $r_i$ satisfying the relation (3) allows minimization of the aberration of the image plane from the concentric spherical surface of a fixed radius $r_i$, thereby achieving satisfactory non-axial imaging characteristic, over the entire focusing range from infinite distance to nearest distance.

Furthermore, the radius $r_i$ preferably satisfies following relation:

$$f \leq r_i \leq f + \frac{f^2}{2(S-f)} \quad (4)$$

As explained above, for an image plane IS concentric with the spherical lens, there will result a negative image plane distortion for a finite object distance, and said distortion becomes larger at a shorter object distance. On the other hand, if the radius $r_i$ of curvature of the image plane IS satisfies the relation (4), said radius $r_i$ becomes smaller the radius of the concentric spherical plane at the focused image position, as the object comes closer, namely in a direction opposite to the negative image plane distortion mentioned above. Therefore, in consideration of the image plane distortion, a radius $r_1$ satisfying the relation (4) further improves the non-axial imaging characteristic, particularly in the vicinity of the nearest object distance.

The spherical lens of the present embodiment, having a spherical image plane IS, has a higher non-axial luminosity of the image plane compared to ordinary photographic lenses. In ordinary photogrpahic lenses the non-axial luminosity of the image plane decreases in proportion to the fourth power of the cosine of half image angle, while, in the present spherical lens, it only decreases in proportion to first order of cosine. Consequently the loss in image plane luminosity over a wide imaging angle is significantly reduced in comparison with the prior technology.

Figure 2:
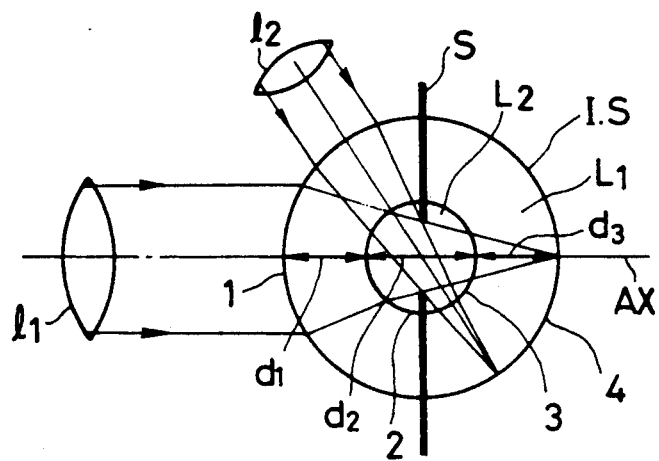
FIG. 2 is a cross-secional view showing another embodiment of the spherical lens of the present invention.

FIG. 2 is a cross-sectional view of another embodiment of the spherical lens of the present invention, wherein same components or members as those in FIG. 1 are represented by same symbols.

The spherical lens of the present embodiment is composed of a spherical shell-shaped lens $L_1$ and a sphere-shaped lens $L_2$, constituting concentric spheres of a basic structure same as that shown in FIG. 1, but, in the present embodiment, the image plane IS exists on the spherical surface at the exit side of the spherical shell-shaped lens $L_1$, namely on the fourth face 4. There are suitably selected the Abbe number $\gamma_1$ and refractive index $n_1$ of the spherical shell-shaped lens $L_1$, and those $\gamma_2$, $n_2$ of the sphere-shaped lens $L_2$.

A non-axial parallel incident light $l_2$ or an axial parallel incident light $l_1$ is refracted at the first and second faces 1, 2, passes the diaphragm S and is refracted by the third face 3 to be focused on the fourth 4 constituting the image plane IS.

Also in the spherical lens of the present embodiment, the Abbe numbers and refractive indexes of the lenses $L_1$, $L_2$ are so selected as to satisfy the conditions (1) and (2), thereby satisfactorily correcting the spherical and chromatic aberrations as in the first embodiment. Also the diaphragm S removes harmful lights such as flare, so that the imaging characteristic on the spherical image plane IS is satisfactory both in the axial and non-axial positions.

Also the use of a spherical image plane IS provides aberrations for the non-axial incident light $l_2$ comparable to those for the axial incident light $l_1$, so that the non-axial characteristics are significantly improved in comparison with those of ordinanry photographic lenses. Also the structure of the present embodiment provides an imaging angle theoretically close to 180°. Since the non-axial characteristics are improved as explained above, there can be obtained a super-wide angle lens with satisfactory imaging performance.

In the foregoing embodiments, the diaphragm S is positioned on a flat plane passing through center of the spherical lens or in the the vicinity thereof, in order to eliminate the axial and non-axial harmful lights such as flare, thereby improving the imaging characteristics. However, in order to eliminate the flare of the axial incident light $l_1$ only, the diaphragm S may be provided at an arbitrary position.

In the following there will be shown numerical examples of the spherical lens of the present invention.

Table 1 shows numerical examples 1-9 of the spherical lens, in which the examples 1-8 correspond to that shown in FIG. 1 while the example 9 corresponds to that shown in FIG. 2.

In Table 1, $r_1$, $r_2$, $r_3$, $r_4$, $n_1$, $n_2$, $\gamma_1$, $\gamma_2$, $d_1$ and $d_2$ represent radii of curvature of the lens faces, refractive indexes and Abbe numbers of the lenses, and axial air gaps between the lens faces, as already explained in relation to FIGS. 1 and 2. The focal length and the F-number of the spherical lens are respectively indicated by f and F No. The values other than those for f and F No. are normalized, by taking the radius of the spherical lens, or of curvature of the first or fourth face ($r_1$ or $-r_4$) as 10. The d-line was used as the reference wavelength in determining $n_1$, $n_2$, $\gamma_1$ and $\gamma_2$.

TABLE 1

| | Numerical examples | | | | | | | | | |
|---|---|---|---|---|---|---|---|---|---|---|
| Example | $r_1 (= -r_4)$ | $r_2 (= -r_3)$ | $d_1 (= d_3)$ | $d_2$ | $n_1$ | $\nu_1$ | $n_2$ | $\nu_2$ | f | $F_{NO.}$ |
| 1 | 10.0 | 4.76254 | 5.23746 | 9.52508 | 1.66446 | 35.8 | 1.51633 | 64.1 | 18.12 | 2.8 |
| 2 | 10.0 | 4.70000 | 5.30000 | 9.40000 | 1.66446 | 35.8 | 1.51633 | 64.1 | 18.23 | 2.8 |
| 3 | 10.0 | 5.00000 | 5.00000 | 10.00000 | 1.71736 | 29.5 | 1.51742 | 52.4 | 18.92 | 2.8 |

TABLE 1-continued

| Example | $r_1 (= -r_4)$ | $r_2 (= -r_3)$ | $d_1 (= d_3)$ | $d_2$ | $n_1$ | $\nu_1$ | $n_2$ | $\nu_2$ | f | $F_{NO.}$ |
|---|---|---|---|---|---|---|---|---|---|---|
| 4 | 10.0 | 5.40000 | 4.60000 | 10.80000 | 1.80518 | 25.4 | 1.53172 | 48.9 | 19.02 | 2.8 |
| 5 | 10.0 | 5.40000 | 4.60000 | 10.80000 | 1.80518 | 25.4 | 1.52310 | 50.8 | 19.53 | 2.8 |
| 6 | 10.0 | 5.00000 | 5.00000 | 10.00000 | 1.72342 | 38.0 | 1.51633 | 64.1 | 19.14 | 2.8 |
| 7 | 10.0 | 4.89166 | 5.10834 | 9.78332 | 1.66446 | 35.8 | 1.51633 | 64.1 | 17.91 | 2.0 |
| 8 | 10.0 | 5.17232 | 4.82768 | 10.34464 | 1.66446 | 35.8 | 1.51633 | 64.1 | 17.50 | 1.4 |
| 9 | 10.0 | 3.45900 | 6.54100 | 6.91800 | 2.50000 | 20.0 | 2.30100 | 31.3 | 10.00 | 1.0 |

FIGS. 3 to 6 are aberration charts showing the spherical and chromatic aberrations of the spherical lenses respectively of the numerical examples 4, 7, 8 and 9 of Table 1, wherein solid lines and chain lines respectively indicate aberrations for the d-line and g-line.

As will be apparent from FIGS. 3 to 6, the structure of FIG. 1 or 2 can provide practically sufficient correction of aberrations regardless of the F-number. The structure of FIG. 1 shows a slight increase of the spherical aberration at a smaller F-number, but the structure of FIG. 2 can almost completely eliminate the spherical aberration even at a small F-number. In case of the structure of FIG. 2, the refractive indexes $n_1$, $n_2$ of the media should preferably exceed 2.0.

The present invention has been explained by FIGS. 1 and 2 and Table 1, but it is naturally possible to form various spherical lenses according to the concept of the present invention.

For example, though the lenses shown in FIGS. 1 and 2 are composed of truly spherical concentric lenses, the lens shape is not limited to such form as long as the light-transmitting faces are spherical. As an example, the upper and lower portions of the spherical lens may be composed of flat faces.

Consequently, the spherical lens in the foregoing and following embodiments of the preset text is not limited to a truly sphere-shaped lens.

Also in the foregoing embodiments the concentric sphere is composed of a sphere-shaped lens $L_1$ and a spherical shell-shaped lens $L_2$, but it is also possible to form a second spherical shell-shaped lens around the spherical shell-shaped lens $L_2$, thereby providing a concentric sphere of three-layered structure. It is furthermore possible to form a concentric sphere having four, five or more layers, and such increase in the number of refractive faces enables more precise aberration correction.

Thus the present invention provides a practical super-wide angle spherical lens of high performance, in which various aberrations, particularly spherical and chromatic aberrations, are satisfactorily corrected.

In contrast to the usual flat image plane, the use of a spherical image plane provides a wide-angle lens system of a large aperture, with a limited number of lenses and without novel glass species, thereby enabling a lower cost and a simplified structure of the lens system.

In an ordinary lens system with a small distortion and with a flat image plane, the size of the image plane increases infinitely as the imaging angle approaches 180°, with significant decrease of the amount of light in the peripheral area of the image plane. Consequently the conventional fish-eye lens is designed with an intentionally large negative distortion, thereby achieving an imaging angle of 180° and preventing the significant loss in the amount of light in the peripheral area. However such negative distortion results in image compression in the peripheral area, thereby reducing the resolving power and deteriorating the imaging characteristics.

On the other hand, in case of imaging an object at an infinite distance with a spherical lens, the image plane becomes a spherical plane having the center of curvature at that of said spherical lens, because of the spherical symmetry of the lens, as explained before. Consequently, in a spherical lens, the non-axial aberrations are comparable to axial aberrations. Consequently the non-axial aberrations can be satisfactorily corrected if the axial aberrations are corrected.

Also an image reading over a wide imaging angle close to 180° can be achieved by placing a sensor, having a spherical light-receiving surface, on said spherical image plane.

More specifically, for a focal length f, an imaging angle of 180° can be achieved with a sensor having a light-receiving area of $2\pi f^2$, so that the sensor can be made compact. Also the resolving power is not lost in the peripheral area, due to the spherical symmetry of the lens. Besides, the amount of light in the peripheral area does not suffer a significant decrease by the cosine fourth-power law in the usual lens, but only decreases in proportion to cosine of the imaging angle.

Consequently the spherical lens of the present invention, through smaller and simpler than the ordinary lens system, can provide a wide-angle optical system with satisfactory imaging performance and with a high luminosity over the entire image plane, through suitable correction of aberrations, thereby providing an imaging device as will be explained in the following.

Now there will be explained the imaging device of the present invention, by means of attached drawings and numerical data.

Figure 7:
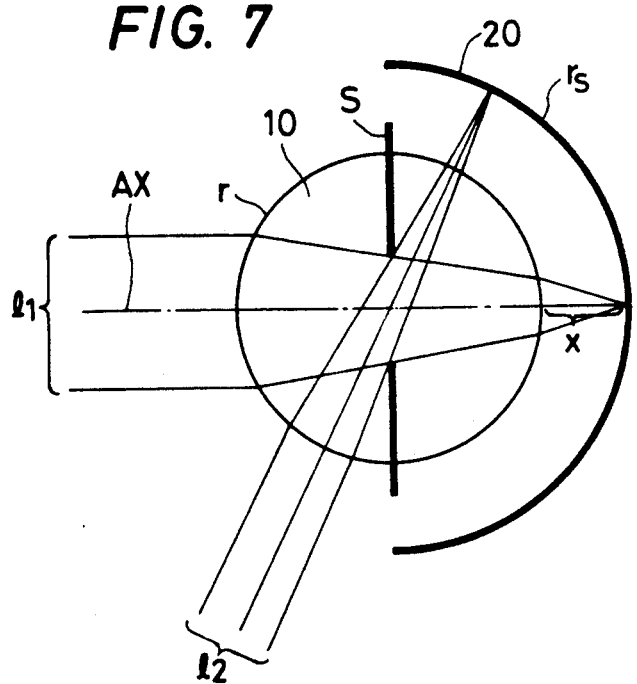
FIG. 7 is a cross-sectional view showing an embodiment of the imaging device of the present invention.

FIG. 7 is a cross-sectional view showing an embodiment of the imaging device of the present invention, also illustrating light paths, wherein shown are a spherical lens 10, an image sensor 20 having a spherical light-receiving surface, a diaphragm S provided in said spherical lens 10, and axial and nonaxial parallel incident lights $l_1$, $l_2$.

The imaging device of the present embodiment is composed of the spherical lens 10 and the image sensor 20 of which light-receiving surface is positioned at the focal plane of said lens 10, wherein said lens 10 and said image sensor 20 are mutually movable in the axial direction focusing. As the focal plane of the lens 10 is positioned outside said lens 10, the image sensor 20 in the present embodiment is spaced by a distance x from the spherical lens 10 along the optical axis AX. The diapharagm S provided in the lens 10, for limiting the light from the object, is positioned on a plane passing through the center of the spherical lens 10 and perpendicular to the optical axis AX, thereby improving the axial and non-axial imaging characteristics.

In FIG. 7, r, $r_s$ and x are physical parameters of the imaging device and respectively indicate the radius of curvature of the spherical lens 10, that of the light-receiving surface of the image sensor 20, and the axial air gap between the image side surface of said lens 10 and said light-receiving surface.

The spherical lens 10 employed in the present embodiment is composed of a uniform medium, whereby an axial incident parallel light $l_1$ or a non-axial incident parallel light $l_2$ is refracted at the object-side face and the image-side face of the spherical lens 10 and enters the light-receiving surface of the image sensor 20. In the following there are shown design data of the imaging device of the present embodiment, wherein r, $r_s$ and x are respectively the radii of curvature of the spherical lens 10 and the image sensor 20 and the axial air gap therebetween, and nd and f are respectively the refractive index for d-line and the focal length of the spherical lens 10.

Numerical Example 10

$r=10.0$;  $nd=1.51633$;  $x=4.68373$;  $f=14.68373$;
$r_s=14.68373$

In the imaging device of this embodiment, the spherical lens 10 and the image sensor 20 are separated in mutually movable manner, but the air gag therebetween can be reduced by increasing the refractive index nd of the spherical lens 10. Particularly if said refractive index is selected close to 2.0, the incident light $l_1$ or $l_2$ can be focused on the end face of the spherical lens 10, i.e. on the spherical surface at the image side. In the following there will be explained an example of the imaging device of this type.

Figure 8:
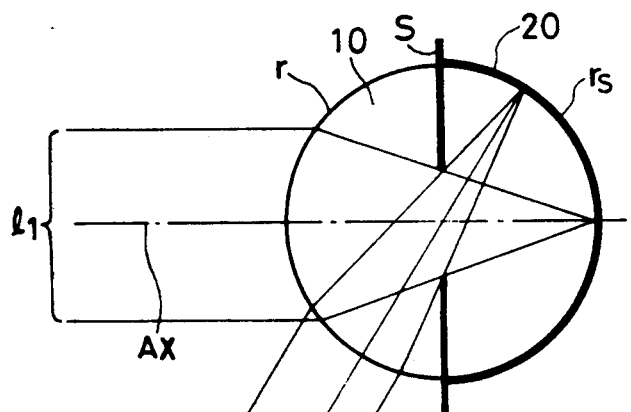
FIGS. 8 and 9 are cross-sectional views showing other embodiments of the imaging device of the present invention.

FIG. 8 is a cross-sectional view of another embodiment of the imaging device of the present invention, wherein same components and parameters as those in FIG. 7 are represented by same symbols.

In the present embodiment, as explained above, the imaging device 20 which is movable relative to the spherical lens 10 has a light-receiving surface on the image-side spherical surface thereof. The diaphragm S is positioned in the same manner as in FIG. 7. The positioning of the light-receiving surface on the image-side spherical surface of the lens 10 enables further reduction in size of the optical system and dispenses with most of the adjustments relating to the optical arrangement.

In the following there will be shown design data of the imaging device of the present embodiment.

Numerical Example 11

$r=10.0$; $nd=2.0$; $x=0.0$; $f=10.0$; $r_s=10.0$

As will be apparent from these design data, the spherical lens in this example has a refractive index as high as $nd=2.0$, thus being capable of focusing on the end face of the lens. Besides, also in this embodiment, the axial and non-axial aberrations can be almost equally corrected.

Figure 9:
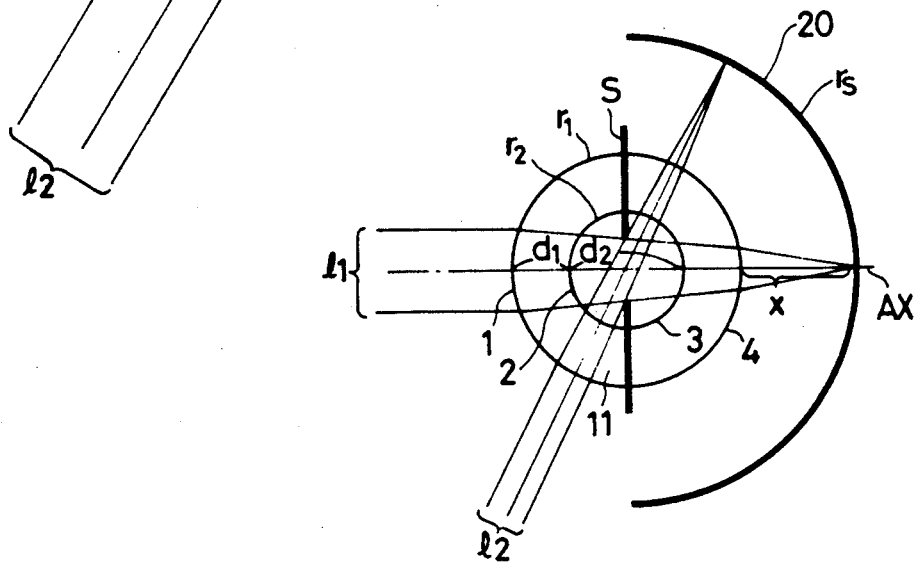

FIG. 9 is a cross-sectional view of another embodiment of the optical system of the present invention, wherein same components and parameters as those of FIGS. 7 and 8 are represented by same symbols. A spherical lens 11 is composed of concentric spheres as shown in FIG. 1 where $r_1$ is the radius of curvature of the first (=third) face, or the external spherical surface, of the lens 11, and $r_2$ is that of the second (or fourth) face, or the internal spherical surface; $d_1$ is the axial distance between first and second (or third and fourth) faces, and $d_2$ is the axial distance between second and third faces, or the diameter of the internal spherical lens.

The imaging device of the present embodiment is composed of a concentric spherical lens 11 and an image sensor 20 having a light-receiving surface at the focal plane of said lens 11. As shown in FIGS. 7 and 8, a diaphragm S is positioned on a plane passing through the center of the concentric lens 11 perpendiculary to the optical axis AX, in order to limit the light from the object.

The concentric lens 11 is composed of an internal sphere-shaped lens of a radius $r_1$ and an external spherical shell-shaped lens of a radius $r_2$ thus providing four refractive faces in total. Thus an axial incident parallel light $l_1$ or a non-axial incident parallel light $l_2$ is refracted in succession by the external object-side spherical face 1, internal object-side spherical face 2, internal image-side spherical face 3 and external image-side spherical face 4 to enter the image sensor 20. The spherical lens 11 and the image sensor 20 are rendered mutually movable in the direction of the optical axis AX.

In the imaging device shown in FIGS. 7 and 8, it is difficult to eliminate aberrations, particularly the chromatic aberration because the spherical lens is composed of a uniform medium, but the use of a concentric lens in the present embodiment as shown in FIG. 1 allows almost complete elimination of chromatic aberration. In the following there will be shown design data of the imaging device of the present embodiment, wherein $r_1$, $r_2$, $d_1$, $d_2$, $r_s$, x and f are same parameters as explained before, and $n_1d$, $\gamma_1d$, $n_2d$ are respectively the refractive indexes and Abbe numbers for d-line of the external spherical shell-shaped lens and the internal sphere-shaped lens.

Numerical Example 12

$r_1=10.0$;  $r_2=5.4$;  $d_1=4.6$;  $d_2=10.8$;  $n_1d=1.80518$;
$\gamma_1d=25.4$;  $n_2d=1.53172$;  $\gamma_2d=48.9$;  $x=9.01925$;
$f=19.01925$;  $r_s=19.01925$ The concentric lens of the present embodiment has satisfactorily corrected spherical and chromatic aberration due to the conditions $n_1d>n_2d$ and $\gamma_1d<\gamma_2d$, and thus provides an improved imaging characteristic in comparision with the imaging devices shown in FIGS. 7 and 8. Also the diaphragm S further improves the imaging characteristic of the present optical system, which can therefore be employed in a video camera or an electronic camera of a wide angle utilizing a CCD or the like as the image sensor 20.

In the following there will be shown data of another example of the present embodiment.

Numerical Example 13

Figure 10A:
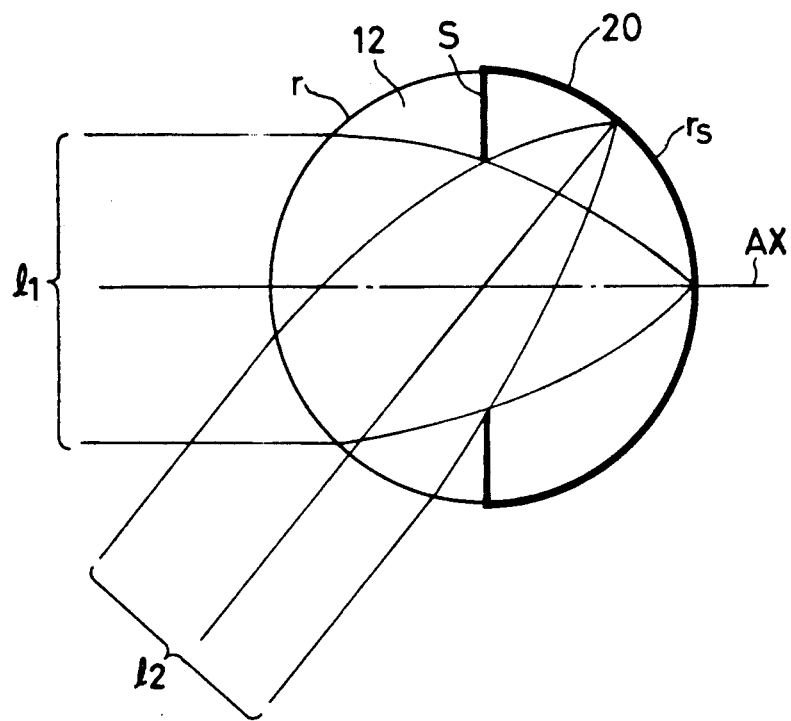
FIG. 10A is a cross-sectional view showing still another embodiment of the imaging device of the present invention.
Figure 10B:
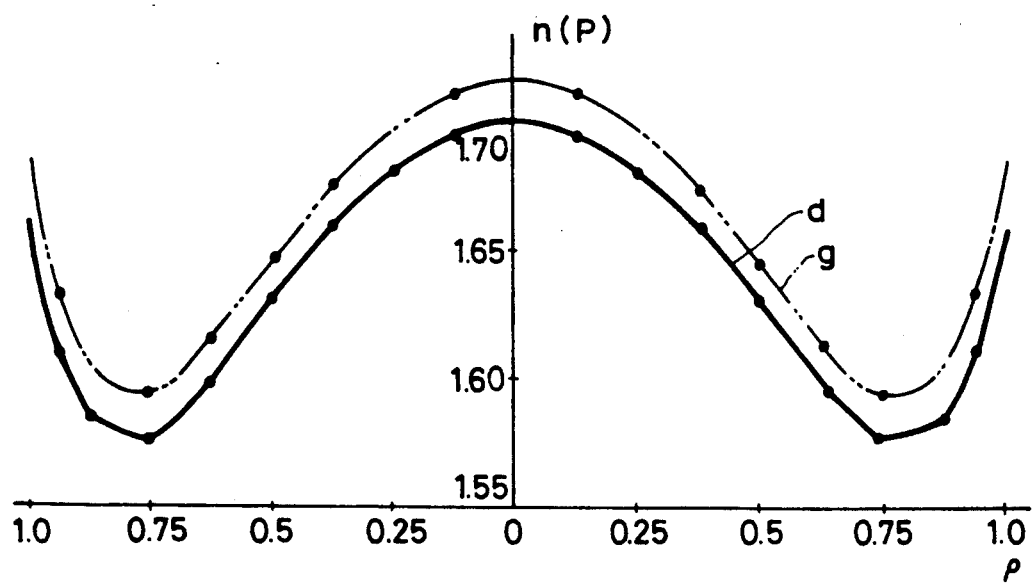
FIG. 10B is a chart showing the distribution of refractive index formed inside the spherical lens of said imaging device.
Figure 16:
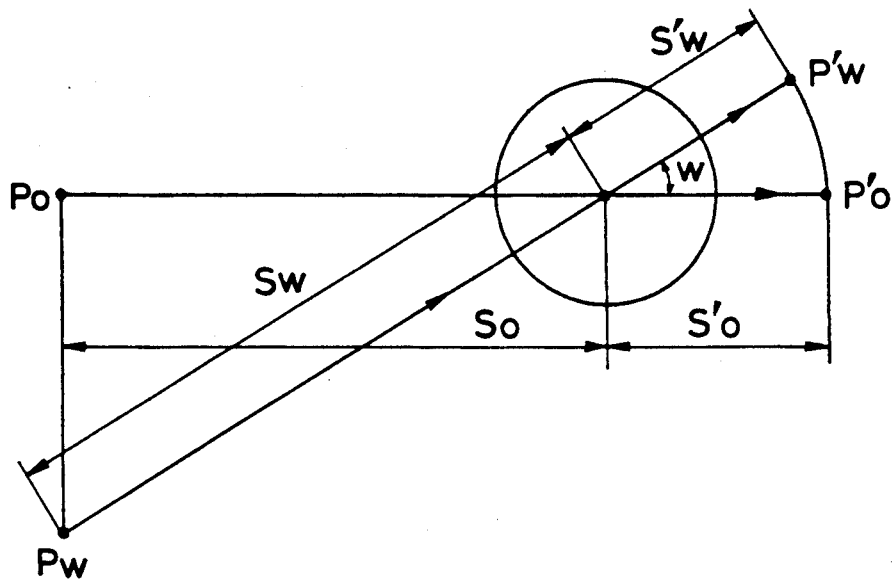
FIG. 16 is a schematic view showing the mode of imaging an object at a finite distance with said imaging device.

$r_1=10.0$;  $r_2=4.89166$;  $d_1=5.10834$;  $d_2=9.78332$
$n_1d=1.66446$;  $\gamma_1d=35.8$;  $n_2d=1.51633$;  $\gamma_2d=64.1$;
$x=7.90692$; $f=17.90692$; $\gamma_s=17.90692$ FIGS. 10A and 10B show still another embodiment of the imaging device of the present invention, wherein FIG. 10A is a corss-sectional view thereof while FIG. 10B shows the distribution of refractive index in the spherical lens. In FIG. 10A, a spherical lens 12 has a spherical symmetrical distribution of refractive index, and other symbols and numbers indicate same parameters and components as in the foregoing embodiments.

In FIG. 10B, the abscissa indicates the distance $\rho$ from the center of the sphere, normalized to the radius of the lens, and the ordinate indicates the refractive index $n(\rho)$ of the lens medium.

The basic structure of the imaging device of the present embodiment is same as that shown in FIG. 8, except that the spherical lens has an internal distribution of refractive index. The spherical lens 12 of the present embodiment is capable of aberration corrections as in the non-spherical lenses, due to the presence of distribution of refractive index as shown in FIG. 10B. Consequently the spherical aberration can be satisfactorily corrected as in the concentric spherical lenses in the foregoing embodiments, and chromatic aberration can also be corrected in a similar manner. In the following there will be given design data of the present embodiment, wherein the parameters are same as those in the foregoing embodiments, and the refractive index distribution $n(\rho)$ for d- and g-line is represented by sixth-order polynomials of $\rho$.

Numerical Example 14

$r = 1.0; f = 1.0; r_s = 1.0;$ $n(\rho)$ for d-line $= 1.70 - 2.92501 \times 10^{-1}\rho^2 -$
$3.08353 \times 10^{-2}\rho^4 + 2.82057 \times 10^{-1}\rho^6$ $n(\rho)$ for g-line $= 1.71592 - 2.91426 \times 10^{-1}\rho^2 -$
$3.76254 \times 10^{-2}\rho^4 + 2.96988 \times 10^{-1}\rho^6$ FIGS. 11 to 15 show the spherical aberrations of the optical systems of the numerical examples 10 to 14.

FIGS. 11 to 12, respectively corresponding to the numerical examples 10 and 11, indicate the spherical aberrations for d-line, while FIGS. 13 to 15, respectively corresponding to the numerical examples 12 to 14 indicate those aberrations for d- and g-lines, thus representing the chromatic aberrations also. These charts only show the axial aberration, since the non-axial aberration is same as the axial one in the spherical lenses of the foregoing embodiments, owing to the spherical symmetry. In these charts the influence of eclipse by the diaphragm S is disregarded.

As already explained before, the image plane of the spherical lens for an object at an infinite distance becomes a spherical plane having a radius of curvature equal to the focal length f.

Consequently the image sensor can be formed as a spherical surface of a radius $r_s = f$ and positioned concentrically with the spherical lens.

Even in non-axial positions there is no coma, astigmatism or image plane curvature, so that the imaging characteristic is same as that on the axial position.

However the image height measured along the light-receiving surface increases proportionally to the image angle w, thus generating a large negative distortion. Such distortion cannot be easily corrected optically, but can be corrected through an electric processing as explained before, by the use of a photoelectric converting element such as a CCD for the image sensor.

FIG. 13 shows the mode of imaging of an object at a finite distance onto the image sensor 20, wherein $P_0$, $P_0'$ are axial object point and image point; $P_w$, $P_w'$ are object point and image point at an image angle w; and $S_0$, $S_w$, $S_0'$ and $S_w'$ and distances between the center of lens and the object point; $P_0$, $P_w$ or the image point $P_0'$, $P_w'$ on the axial position and at an image angle w, wherein $S_0$, and $S_0$ are correlated by:

$S_0' = S_0 f/(S_0 - f)$ (5)

A similar relation also stands for non-axial imaging, due to the symmetry of the spherical lens, so that:

$S_w' = S_0' f/\{S_0'(1 - \cos W) + f \cdot \cos W\}$ (6).

Therefore, for an object at a finite distance, the light-receiving face of the image sensor should most desirably coincide with the image plane respresented by the equations (5) and (6).

It is an aspherical plane having a peraxial radius $S_0$, of curvature represented by (5) and having a stronger inclination of the plane at a larger image angle.

If the sensor face is made spherical in consideration of the ease of manufacture, the radius $r_s$ thereof can be selected substantially equal to $S_0$, as indicated by the relation (1). In this case, however, the image plane is displaced from the sensor surface toward the lens (negative image plane curvature) as the image angle increases.

However this aberration is practically permissible if the image angle and lens aperture are relatively small, or if the distance to the object is relatively large.

Also in case of focusing by varying the distance between the spherical lens and the image sensor according to the distance to the object, the curved image plane represented by the equations (5) and (6) varies continuously, so that the image plane cannot be completely matched with the sensor surface for all the distances to the object. In such case, the light-receiving face of the image sensor should preferably satisfy the following relation, similar to the aforementioned relation (3), wherein $r_s$ is the paraxial radius of curvature:

$f \leq r_s \leq S_0 f/(S_n - f)$ (7)

wherein $S_n$ is the distance from the nearest object point to the center of the spherical lens. The right-hand side of this relation (7) indicates the position of the image plane from the lens center, corresponding to the nearest object point. Selection of $r_s$ satisfying the relation (7) reduces the difference between the light-receiving face of the sensor and the paraxial image plane and maintains satisfactory non-axial imaging characteristic, over the entire focusing range.

It is furthermore desirable that $r_s$ satisfies following relation, substantially equivalent to the relation (4):

$f \leq r_s \leq f + F^2/2(S_n - f)$ (8)

As explained before, when the light-receiving face of the sensor is a spherical surface concentric with the spherical lens, there will result a negative image plane curvature for a finite object distance, stronger at a shorter object distance. On the other hand, if the paraxial radius $r_s$ of the light-receiving face of the sensor satisfies the relation (8), the distance from the lens center to the image plane becomes a larger than $r_s$ as the object approaches the nearest point, in a tendency to compensate said negative image plane curvature. Thus, in consideration of the image plane curvature, the relation (8) allows the non-axial imaging characteristics to improve, particularly for an object close to the nearest point.

The light-receiving surface of the image sensor in the foregoing embodiments is formed as a spherical surface, but an aspherical surface may also be employed. Also the refracting faces of the spherical lens may also be made aspherical, and a significant improvement in performance for shorter distances can be expected.

In an ordinary optical system with a flat image plane, the luminosity thereon decreases in proportion to $\cos^4\theta$, wherein $\theta$ is tthe incident angle of light. On the other hand, the imaging device of the present invention employing a spherical image plane only shows a decrease in luminosity proportional to $\cos\theta$, thereby allowing use over a super-wide angle.

Also the conversion of an optical signal into electrical signal, for example by photoelectrical conversion with CCD, enables correction of distortion through appropriate signal processing.

Also a structure in which the sensor is in contact with an end face of the sperical lens, as shown in FIGS. 8 and 10A, is advantageous in compactness and in absence of adjustment for the lens-sensor distance, and is simpler in comparison with the conventional photographic lenses.

As explained in the foregoing, the imaging device of the present invention can provide a superwide image angle, and a satisfactory imaging characteristic over such super-wide image angle. Also the loss in the amount of light in the peripheral area of the image plane is reduced by the combination of a spherical lens and a spherical image plane.

The electrical signal obtained by an image sensor having a light-receiving surface, positioned along the curved image plane of the spherical lens, can be electrically processed to correct the distortion aberration that cannot be corrected optically, as already explained before. Stated differently, an arbitrary distortion can be generated electrically. Also it is possible to electrically select an arbitrary area of the image formed on the light-receiving surface and to enlarge the thus selected area. Such partial enlarging function will be called electronic zooming function.

In the following there will be explained a further detailed embodiment of the present invention.

Figure 17:
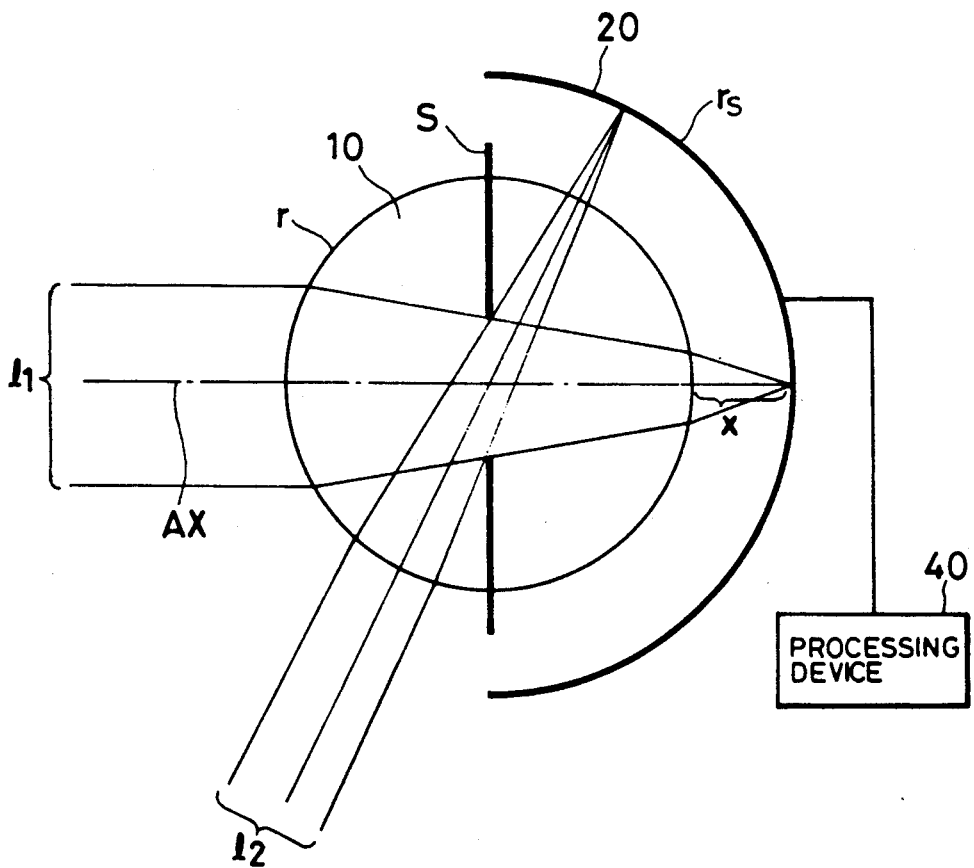
FIG. 17 is a schematic view showing an example of the imaging device of the present invention.

FIG. 17 is a cross-sectional view of a detailed embodiment of the imaging device of the present invention, also showing light paths therein, wherein shown are a spherical lens 10; an image sensor 20 having a spherical light-receiving surface; a diaphragm S provided inside the spherical lens 10; a processing unit 40 for processing the image signal from the image sensor 20; and axial and non-axial incident parallel lights $l_1$, $l_2$.

In the present embodiment, the imaging device is composed, as in FIG. 7, of the spherical lens 10 and the image sensor 20 having the light-receiving surface at the focal plane of said lens 10. Since said focal plane is positioned outside the lens 10, the image sensor 20 is spatially separated, by a distance x on the optical axis, from the spherical lens 10. The diaphragm S, for limiting the light from the object, is positioned on a plane passing through the center of the lens 10 perpendicularly to the optical axis AX, in order to improve the axial and non-axial imaging characteristic.

In FIG. 17, parameters r, $r_s$, x respectively indicate the radii of curvature of the spherical lens 10 and of the light-receiving surface of the image sensor 20, and the axial air gap between the image-side spherical face of the lens 10 and said light-receiving surface of the image sensor 20.

The spherical lens employed in the present embodiment is composed of a uniform medium, in the same manner as the spherical lens shown in FIG. 7, whereby the axial or non-axial incident parallel light $l_1$ or $l_2$ is refracted by the object-side face and the image-side face of the spherical lens 10 and enters the light-receiving surface of the image sensor 20.

Figure 18:
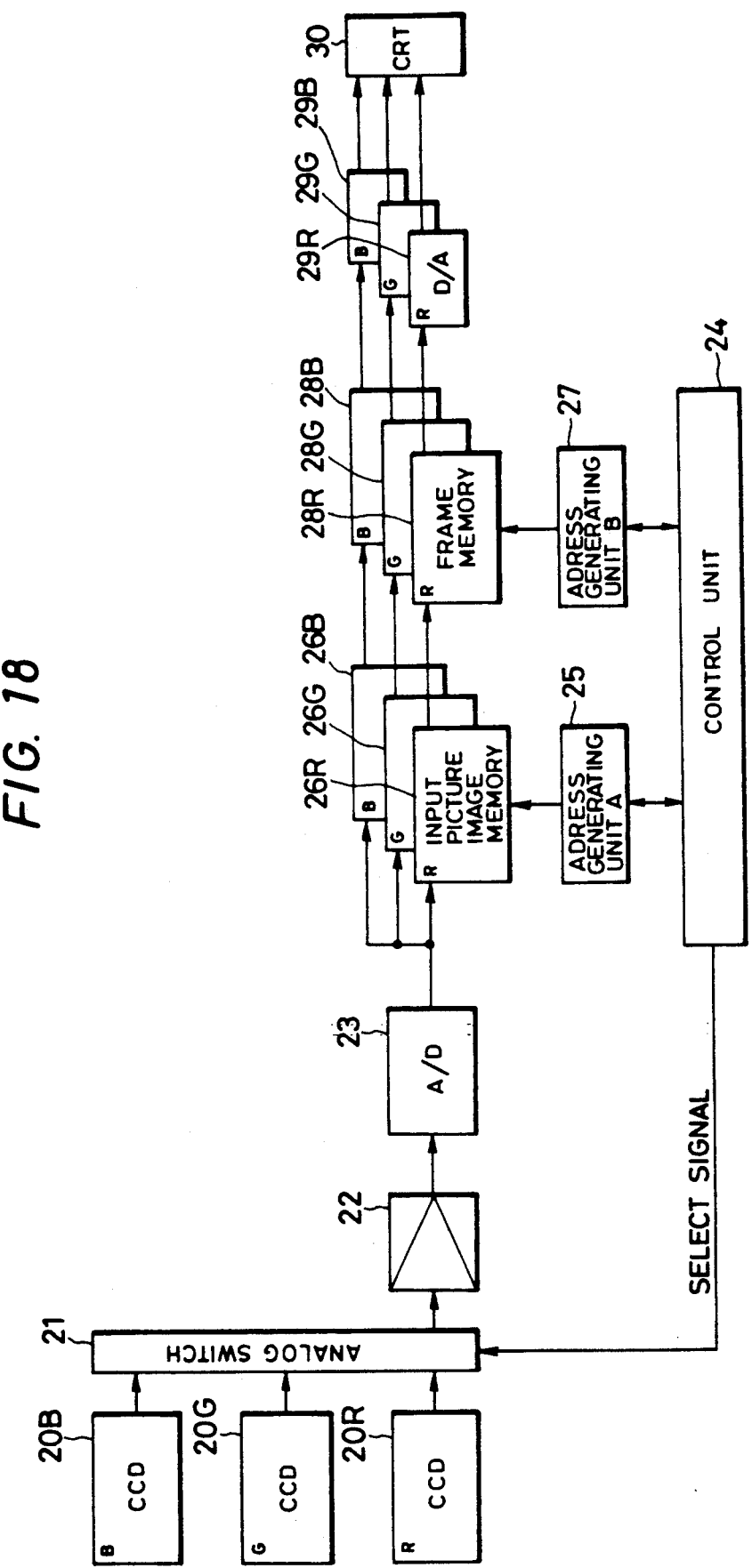
FIG. 18 is a block diagram of the electric circuit of a processing unit shown in FIG. 17.

FIG. 18 is a block diagram showing an example of the processing unit, shown in FIG. 17, for transmitting and processing a color image signal obtained from the image sensor 20 composed of a CCD, for display on a cathode ray tube. In FIG. 18 there are shown CCD's 20R, 20G, 20B respectively corresponding to red, green and blue; an analog switch 21 for selecting the connection with the CCD's; an amplifier 22; and A/D converter 23; input image memories 26R, 26G, 26B respectively corresponding to red, green and blue; frame memories 28R, 28G, 28B respectively corresponding to red, green and blue; D/A converters 29R, 29G, 29B; a cathode ray tube 30 constituting a display unit; an address generator 25 for the image memories 26R, 26G, 26B; an address generator 27 for the frame memories 28R, 28G, 28B; and a control unit 24 for generating select signals for the analog switch 21 and control signals for the address generators 25, 27.

Output signals from the CDD's 20R, 20G, 20B is transmitted by the analog switch 21, then amplified by the amplifier 22, converted by the A/D converter 23 into a digital signal and supplied to the input image memories 26R, 26G, 26B. The image data therein are transferred to the frame memories 28R, 28G, 28B, then converted into an analog signal by the A/D converters 29R, 29G, 29B and displayed on the cathode ray tube 30.

The addresses for the input image memories 26R, 26G, 26B are generated by the address generator A25, while those for the frame memories 28R, 28G, 28B are generatred by the address generator B27. The select signals for the analog switch 21 and the timing of address generation are controlled by the control unit.

The processing unit 40 of the imaging device of the present embodiment can achieve various effects through the control of the address generators A, B by the control unit 24. For example, a distortion can be created in the image by displacing the addresses generated by the generator A25 from the original addresses, in response to a signal from the control unit 24. In case of a spherical lens with a focal length f, an incident light of an incident angle $\theta$ (rad) has an image height $f\theta$. Since the image height in an ordinary lens is $f.\tan\theta$, the image obtained with a spherical lens will have a distortion if it is converted into a planar image.

However, the above-mentioned method allows correction of the distortion in the image of the spherical lens. Also as another effect, a part of the image can be displayed in enlarged manner by limiting the addresses generated by the address generator B27 to a part of the image stored in the frame memories 28R, 28G, 28B according to a signal from the control unit 24. An electronic zooming is achieved in this manner.

It is furthermore possible to regulate the charge accumulating time of CCD's for electrically regulating the amount of light, thereby achieving so-called electronic diaphragm.

Figure 19A:
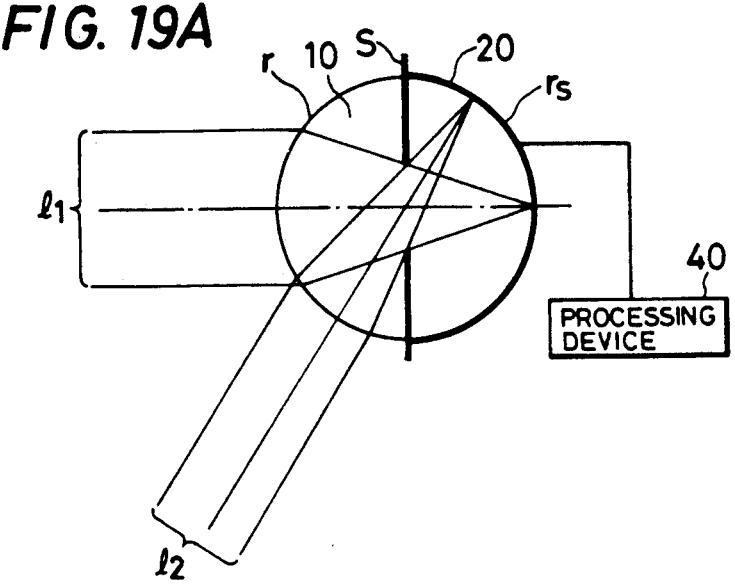
FIGS. 19A to 19C are schematic views showing variations of the imaging device shown in FIG. 17.
Figure 19B:
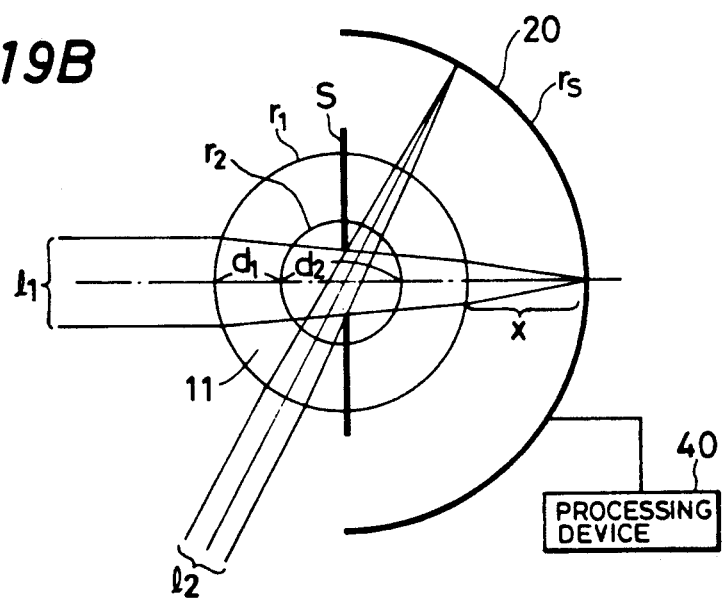
Figure 19C:
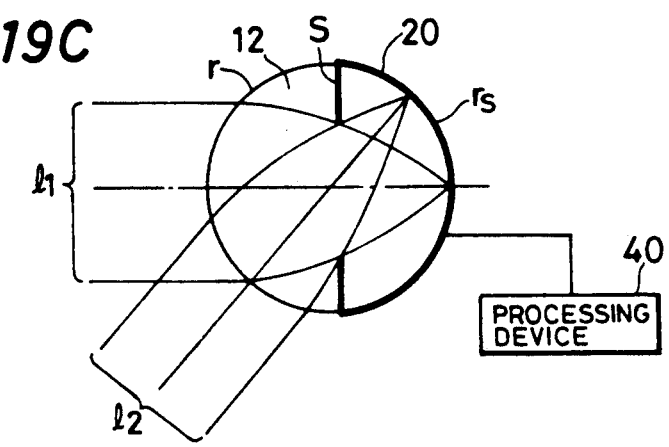

FIGS. 19A, 19B and 19C show variations of the imaging device shown in FIG. 17, wherein same components or parameters as those in the foregoing embodiments are represented by same symbols or numbers.

The imaging devices shown in FIGS. 19A to 19C are provided with a processing unit of the structure shown in FIG. 18, as employed in the imaging device shown in FIG. 17. These imaging devices are different from that of FIG. 17 in the structure of the spherical lens. The spherical lens in FIG. 1A is same as that shown in FIG. 8, while that in FIG. 19B is same as the lens shown in FIG. 9, and that in FIG. 19C is same as the lens shown in FIGS. 10A and 10B.

The imaging devices shown in FIGS. 19A to 19C have equivalent function to that of the device shown in FIG. 17, capable achieving a wide image angle, a high imaging characteristic and multiple functions.

Figure 20:
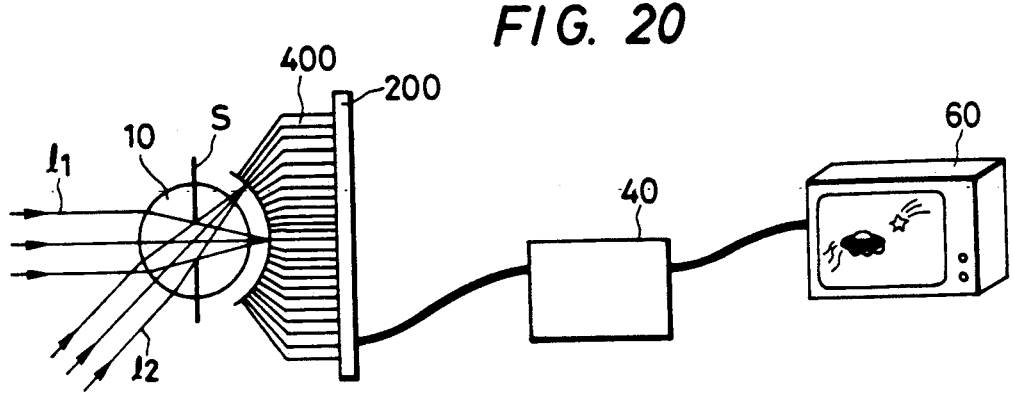
FIG. 20 is a schematic view of still another embodiment of the imaging device of the present invention.

FIG. 20 schematically shows still another embodiment of the imaging device of the present invention, wherein illustrated are a spherical lens 10; a processing unit 40 for executing various image processings; a diaphragm S; a bundle of light transmitting members 400 composed for example of optical fibers; an image sensor 200 such as a CCD having a flat light-receiving surface; and a display unit 60 composed of a cathode ray tube or a liquid crystal display device.

Also there are shown axial and non-axial incident parallel lights $l_1$ and $l_2$, corresponding to the lights from an object at an infinite distance.

The diaphragm S is positioned on a plane passing through the center of the spherical lens 10 perpendicularly to the optical axis, for limiting the diameter of the axial and non-axial light beams, thereby controlling the imaging characteristic.

The shperical lens 10 has the forcal point outside said lens, so that incident parallel lights $l_1$, $l_2$ are focused on a spherical image plane separated by a predetermined distance from the spherical lens 10. On said spherical image plane positioned are the entrance ends of the light transmitting members 400, of which exit ends are positioned opposite to the light-receiving surface of the image sensor 200. Consequently the light $l_1$ or $l_2$ forcused by the spherical lens 10 onto the shperical image plane is transmitted, by at least a light transmitting member having the entrance end at the focused position, to one or plural pixels of the image sensor 20. In this manner the image of an unrepresented object is focused, by the spherical lens 10, as a curved image with a predetermined image magnification on the spherical image plane, and said curved image is transmitted, by the bundle of the light transmitting members 400, to the image sensor 200 as a flat image.

The object image transmitted by the bundle of the light transmitting members 400 is photoelectrically converted by the image sensor 200, thus providing the processing unit 40 with an electric image signal.

The processing unit 40 applies various processes such as zooming or distortion correction, to the image signal obtained from the image sensor 200, and supplies the thus processed image signal to the display unit 60 for displaying the image of the object.

The bundle of the light transmitting memebers 400 in FIG. 20 has a radial arrangement of the members in such a manner that the optical axis of each light transmitting member is substantially perpendicular to the curved image plane, and such bundle is useful in that it has a high light-receiving efficiency and is capable of transmitting the image over a wide angle. On the other hand, the usual light-transmitting bundle having parallel arrangement of light-transmitting members such as optical fibers is advantageous in cost and manufacturing precision, though the image angle is smaller in comparison with the above-mentioned radial arrangement.

The spherical lens 10 and the bundle of the light transmitting members 400 are mutually separated, but they may also be mutually contracted.

Whether the spherical lens 10 is separated from or contacted with the bundle of light transmitting member is principally determined by the specification of the lens 10. Also the spacing between the spherical lens 10 and the entrance ends of the light transmitting members may be varied for focusing. For this purpose there may be provided driving means for driving the spherical lens 10 or the bundle of the light transmitting members 400.

There may therefore result a situation where the spherical lens 10 is contacted with the entrance ends of the light transmitting members 400 for an object of a large distance, but is separated therefrom for an object of a small distance.

A spherically symmetrical lens such as a spherical lens 10 does not show enhanced aberration for non-axial lights, because the axial and non-axial lights are similarly refracted, thus providing a high resolving power over a wide image angle.

However, in such case, the image plane becomes curved, and an image sensor with a flat light-receiving surface cannot be used. Consequently the curved image is converted into a flat image with light transmitting members 400, and then supplied to the image sensor. The light transmitting members 400 are arranged on a flat plane at an end, and, at the other end, along a plane similar to the image plane of the spherical lens. The entrance ends of the members 400 are placed substantially on the image plane of the spherical lens, while the exit ends are contacted with the planar light-receiving surface of the image sensor, thereby enabling the image of object to be transmitted from the spherical lens 10 to the image sensor 200 while maintaining a high resolving power.

It is also possible to provide an imaging optical system between the light transmitting members 400 and the image sensor 200, thereby focusing a plannar image, formed on the exit ends of the light transmitting members 400, onto the light-receiving surface of the image sensor 200. In this case it is also possible to provide said optical system with an arbitrary distortion aberration for correcting the inevitable distortion generated in the spherical lens.

Also the entrance and exit faces of the optical fibers and the lens may be provided with an antireflective treatment for supressing flare, thereby further improving the imaging characteristic.

In the present invention, the entrace ends of the light transmitting members 400 need not be positioned on a shperical plane concentric with the spherical lens 10, and said entrance ends need not be arranged spherically as will be explained later. Also the refractive faces of the lens 10 may be formed aspherical. Furthermore, the spherical symmetry may be slightly aberrated in the spherical optical system. The spherical lens 10 may be suitably provided in this manner, to achieve an improvement in the imaging characteristic for a short object distance.

The image signal of the object may also be supplied to a recording device such as a printer, instead of the display unit 60, for image output. Furthermore, the image signal may be supplied to an image transmitting device such as a facsimile for sending the image to a distant place.

The processing unit 40 shown in FIG. 20 is composed of electric circuits as shown in FIG. 18, for executing various image processing, such as electronic zooming, electronic diaphragm and distortion correction. Consequently various image information can be obtaind from the display unit 60.

FIGS. 21A to 21H illustrate various variations of the imaging device of the present embodiment, wherein shown are a spherical lens 10 of a uniform medium; a disphragm S; an image sensor 200; a concentric spherical lens 11 explained before; optical fibers 410 arranged mutually parallel and having entrance ends arranged in a spherical plane; and optical fibers 420 in which the optical axes of the entrance ends are arranged radially to the center of the spherical lens 10 or 11.

Figure 21A:
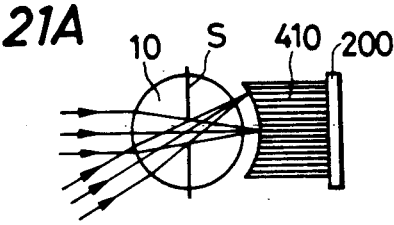
FIGS. 21A to 21H are cross-sectional views showing variations of the image pickup unit of the apparatus shown in FIG. 20.
Figure 21E:
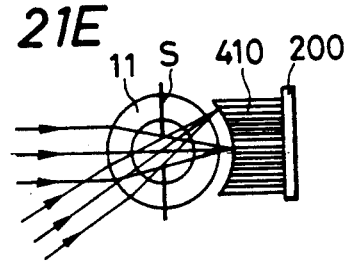
Figure 21B:
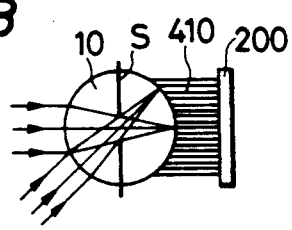
Figure 21F:
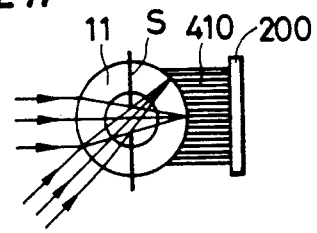
Figure 21C:
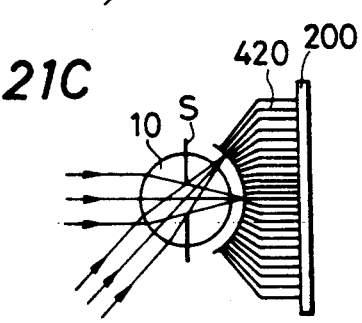
Figure 21G:
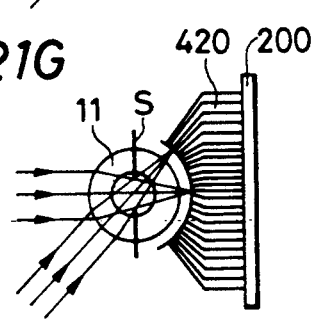
Figure 21D:
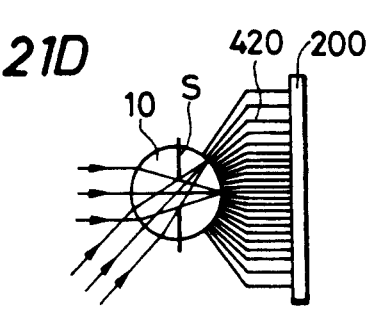
Figure 21H:
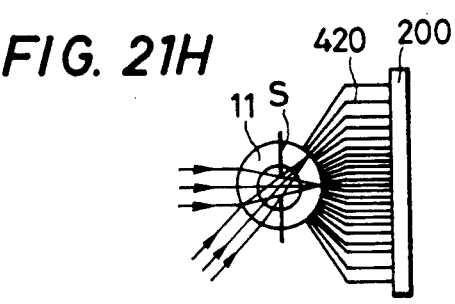

FIGS. 21A to 21D show devices employing a spherical lens of uniform medium. In FIGS. 21A and 21C, the entrance ends of the optical fibers 410 are positioned on a spherical image plane outside the spherical lens 10, while in FIGS. 21B and 21D said entrance ends are contacted with the spherical image plane positioned on the spherical surface of the lens 10. In FIGS. 21A and 21B the optical fibers 410 have mutually parallel optical axes, while, in FIGS. 21C and 21D, the entrance ends of the optical fibers 420 have radially arranged optical axes. FIGS. 21E to 21H show imaging devices employing a concentric spherical lens 11, respectively corresponding to those shown in FIGS. 21A to 21D with respect to the arrangement of optical fibers, except for the difference in lens structure.

The spherical lens is not limited to that of uniform medium or of concentric structure as shown in FIGS. 21A to 21H but can be of a lens having an internal distribution of refractive index as explained before. Particularly a concentric spherical lens or a lens with an internal distribution of refractive index, or a spherical lens having an aspherical face at least at the image side or the object side allows easy correction of aberrations and has satisfactory imaging characteristic, thus providing a high resolving power. The diaphragm S is not essential, and may be used or dispensed with according to the imaging performance and the specifications of the device required. The diaphragm S shown in FIGS. 21A-21H and in FIG. 20 is positioned on a plane passing through the center of the spherical lens, but its position can be arbitrarily changed also according to the imaging performance and the specifications of the device requried. However said diaphragm is preferably poitioned on the plane passing through the center of the sphere as shown in FIGS. 20 and 21A-21H in order to btain satisfactory imaging characteristic in the axial and non-axial positions, and a variable diaphragm can provide a further useful device.

The imaging devices shown in FIGS. 20 and 21A-21H only represent certain embodiments of the present invention, and other variations are naturally possible. Particularly, arbitrary changes can be made in the form of spherical lens, light transmitting memebers such as optical fibers and form thereof, and form of the imaging means composed of an image sensor such as a CCD. Thus the present invention can provide an imaging device provided with a wide imaging angle and a high resolving power, utilizing the wide imaging angle of the spherical lens and guiding a curved image, obtained by said spherical lens, to an image sensor after conversion into a planar image with a simple method.

In the following there will be given numerical examples of the spherical lens employed in the present imaging device. The following Table 2 lists data of various spherical lenses of numerical examples 15 to 19, wherein the numerical example 15 provides a spherical lens of uniform medium with an external focal point, and the numerical example 16 provides a spherical lens of uniform medium with a focal point positioned on the spherical surface of the lens. Numerical examples 17 and 18 provide tow-layered concentric spherical lenses with an external focal point and with correction for chromatic aberration, and the numerical example 19 provides a spherical lens with an internal distribution of refractive index with correction for chromatic aberration and with a focal point on the spherical surface of the lens, and the numerical example 20 provides a two-layered concentric spherical lens with a focal point on the spherical surface of the lens and with correction for chromatic aberration.

In Table 2 there are shown the radius r of curvature of spherical lens; refractive index $n_d$ of the lens medium for d-line; focal length f; radius $r_s$ ($r_s > 0$) of curvature of the curved image plane; air gap x between the spherical lens and the entrance ends of light transmitting members; radius $r_1$ of curvature of the external spherical surface in a concentric spherical lens; a radius $r_2$ of curvature of the internal spherical surface in a concentric spherical lens; refractive index $n_{1d}$ and Abbe number $\gamma_{1d}$ for d-line of the medium of the external spherical shell-shaped lens in a concentric spherical lens; refractive index $n_{2d}$ and Abbe number $\gamma_{2d}$ for d-line of the medium of the internal sphere-shaped lens of a concentric spherical lens. The $n(\rho)$ shown in the numerical example 19 indicates the distribution of refractive index in the lens and shows the refractive index fo d-line and g-line in a sixth-order polynomial of the distance $\rho$ from the center of the sphere.

FIGS. 22 to 26 are aberration charts of the lenses of the numerical examples 15 to 19. These charts principally show spherical aberrations, and indicate that satisfactory corrections are achieved for the optical system of this kind.

---

[Numerical example 15] (Uniform spherical lens)
$\gamma = 10.0$   $n_d = 1.51633$   $1 = 4.68373$   $f = 14.68373$   $\gamma_s = 14.68373$

[Numerical example 16] (Uniform spherical lens; focus on end spherical surface)
$\gamma = 10.0$   $n_d = 2.0$   $f = 10.0$   $\gamma_s = 10.0$   $1 = 0$

[Numerical example 17] (Two-layered concentric spherical lens, chromatically corrected)
$\gamma_1 = 10.0$   $\gamma_2 = 5.4$   $d_1 = 4.6$   $d_2 = 10.8$   $n_{1d} = 1.80518$   $\nu_{1d} = 25.4$   $n_{2d} = 1.53172$
$\nu_{2d} = 48.9$   $1 = 9.01925$   $f = 19.01925$   $\gamma_s = 19.01925$

[Numerical example 18] (Two-layered concentric spherical lens, chromatically corrected)
$\gamma_1 = 10.0$   $\gamma_2 = 4.89166$   $d_1 = 5.10834$   $d_2 = 9.78332$   $n_{1d} = 1.66446$   $\nu_{1d} = 35.8$
$n_{2d} = 1.51633$   $\nu_{2d} = 64.1$   $1 = 7.90692$   $f = 17.90692$   $\gamma_s = 17.90692$

[Numerical example 19] (Spherical lens with distributed refractive index, chromatically corrected, focal point on end spherical surface)

$\gamma = 1.0$
for d-line $n(\rho) = 1.70 - 2.92501 \times 10^{-1} \cdot \rho^2 - 3.08353 \times 10^{-2} \cdot \rho^4 + 2.82057 \times 10^{-1} \cdot \rho^6$
for g-line $n(\rho) = 1.71592 - 2.91426 \times 10^{-1} \cdot \rho^2 - 3.76254 \times 10^{-2} \cdot \rho^4 + 2.96988 \times 10^{-1} \cdot \rho^6$
$f = 1.0$   $\gamma_s = 1.0$   $1 = 0$

[Numerical example 20] (Spherical lens with distributed refractive index, chromatically corrected, focal point on end spherical surface)

-continued $\gamma_1 = 10.0 \quad \gamma_2 = 3.459 \quad d_1 = 6.541 \quad d_2 = 6.918 \quad n_{1d} = 2.500 \quad \nu_{1d} = 20.0 \quad n_{2d} = 2.301$
$\nu_{2d} = 31.3 \quad f = 10.0 \quad \gamma_s = 10.0 \quad 1 = 0$ As explained in the foregoing embodiments, the entrance ends of the light transmitting members are preferably concentric with the spherical lens, but, an the case of focusing by varying the distance between said entrance ends and the spherical lens, the curvature of said entrance ends has to be continuously varied in order to maintain this concentric relation. Such arrangement is not practical, and the radius $r_s$ of curvature of said entrance ends should naturally be fixed for practical purpose.

In such a case the radius $r_s$ is considered equal to $r_i$ and should preferably so selected as to satisfy the relation (1).

Such selection of $r_s$ to satisfy the condition (1) reduces the displacement of the entrance ends from the concentric spherical surface and maintains satisfactory non-axial imaging characteristic over the entire focusing range.

Said radius $r_s$ of the entrance ends should preferably satisfy the relation (2) also.

As explained before, when the entrance ends of the light transmitting members are positioned concentric with the spherical lens, there will result a negative image plane curvature for a finite object distance, larger at a shorter distance. On the other hand, if said radius $r_s$ of the entrance ends satisfy the relation (2), $r_s$ becomes smaller than the radius of curvature of the concentric spherical surface as the object distance becomes shorter, in a direction to cancel said negative image plane curvature. Thus, in consideration of the image plane curvature, said relation (2) allows satisfactory non-axial imaging characteristic, particularly for an object close to the nearest object point. The surface of the entrance ends of the light transmitting members in the foregoing embodiments is made spherical, but it may also be formed aspherical.

Such aspherical surface may be obtained by an arbitrary method in the preparation of the end face of a bundle of said members, and can be obtained much easier than, for example, an image sensor with an aspherical light-receiving surface.

As explained in the foregoing, the present invention provides a novel imaging device which is provided with a wide image angle and a high resolving power, and which can be easily formed from easily available components.

We claim:

1. An imaging system comprising:
a spherical lens with a curved image plane formed by a spherical shell-shaped lens composed of a medium with a refractive index $n_1$ and a sphere-shaped lens composed of a medium with a refractive index $n_2$ that is smaller than $n_1$ ($n_2 < n_1$) and positioned inside said spherical shell-shaped lens to constitute a concentric sphere therewith;
imaging means having a light-receiving surface curved along the curved image plane of said spherical lens and adapted to pick-up the image formed by said spherical lens with said light-receiving surface, wherein said spherical lens and imaging means are mutually movable along the optical axis; and
processing means for processing image signals output from said imaging means.

2. A system according to claim 1, wherein said spherical lens comprises a diaphragm on a plane passing through the center of the sphere.

3. An imaging system comprising:
a spherical lens with a curved image plane formed by a spherical shell-shaped lens composed of a medium with a refractive index $n_1$ and a sphere-shaped lens composed of a medium with a refractive index $n_2$ that is smaller than $n_1$ ($n_2 < n_1$) and positioned inside said spherical shell-shaped lens to constitute a concentric sphere therewith;
a bundle of light transmitting members of which light entrance ends are positioned along the curved image plane of said spherical lens and which are adapted to transmit an image by said spherical lens to light exit ends thereof, wherein said spherical lens and entrance ends are mutually movable along the optical axis; and
imaging means having a light-receiving surface in the vicinity of said light exit ends of said bundle and adapted to pick-up said image with said light-receiving surface.

4. A system according to claim 3, further comprising process means for processing image signal obtained by said imaging means.

5. A system according to claim 3, wherein spherical lens comprises a diaphragm on a plane passing through the center of the sphere.

6. A system according to claim 3, wherein said bundle of members comprises optical fibers.

7. An imaging system comprising:
a spherical lens with a curved plane consisting of a homogeneous medium;
imaging means having a light-receiving surface curved along the curved image plane of said spherical lens and adapted to pick-up the image formed by said spherical lens with said light-receiving surface, wherein said spherical lens and imaging means are mutually movable along the optical axis; and
processing means for processing image signals output from said imaging means.

8. A system according to claim 7, wherein said spherical lens comprises a diaphragm on a plane passing through the center of the sphere.

9. An imaging system comprising:
a spherical lens with a curved image plane consisting of a homogeneous medium;
a bundle of light transmitting members of which light entrance ends are positioned along the curved image plane of said spherical lens and which are adapted to transmit an image formed by said spherical lens to light exit ends thereof, wherein said spherical lens and entrance ends are mutually movable along the optical axis; and
imaging means having a light-receiving surface in the vicinity of said light exit ends of said bundle and adapted to pick-up said image with said light-receiving surface.

10. A system according to claim 9, further comprising process means for processing image signal obtained by said imaging means.

11. A system according to claim 9, wherein the spherical lens further comprises a diaphragm on a plane passing through the center of the sphere.

12. A system according to claim 9, wherein said bundle of light transmitting members comprises optical fibers.

13. An imaging system comprising:

a spherical lens with a curved image plane;

imaging means having a light-receiving surface curved along the curved image plane of said spherical lens and adapted to electrically pick-up the image formed by said spherical lens with said light-receiving surface, wherein said spherical lens and imagaing means are mutually movable along the optical axis; and processing means for processing image signals output from said imaging means.

14. A system according to claim 13, wherein said spherical lens comprises a diaphragm on a plane passing through the center of the sphere.

15. An imaging system comprising:

a spherical lens with a curved image plane;

photoelectric transfer means having a light-receiving surface curved along the curved image plane of said spherical lens and adapted to electrically pick-up the image formed by said spherical lens with said light-receiving surface, wherein said spherical lens and imaging means are mutually movable along the optical axis; and processing means for processing image signals output from said photoelectric transfer means.

16. A system according to claim 15, wherein said spherical lens comprises a diaphragm on a plane passing through the center of the sphere.

* * * * *

UNITED STATES PATENT AND TRADEMARK OFFICE
CERTIFICATE OF CORRECTION

PATENT NO. : 5,004,328

DATED : April 2, 1991

INVENTOR(S) : Suzuki et al

It is certified that error appears in the above-identified patent and that said Letters Patent is hereby corrected as shown below:

Column 20, line 61, "speri-" should read --spheri- --.

Column 21, line 19, "imagaing means" should read --imaging means--.

Signed and Sealed this

Twentieth Day of October, 1992

Attest:

DOUGLAS B. COMER

*Attesting Officer*     *Acting Commissioner of Patents and Trademarks*